(12) United States Patent
Chang (10) Patent No.: US 11,226,059 B2
(45) Date of Patent: Jan. 18, 2022

(54) PIPE CONNECTING SEAT

(71) Applicant: Ping-Yueh Chang, Tainan (TW)

(72) Inventor: Ping-Yueh Chang, Tainan (TW)

( * ) Notice: Subject to any disclaimer, the term of this patent is extended or adjusted under 35 U.S.C. 154(b) by 348 days.

(21) Appl. No.: 16/584,935

(22) Filed: Sep. 26, 2019

(65) Prior Publication Data

US 2021/0095804 A1 Apr. 1, 2021

(51) Int. Cl.
*F16L 37/14* (2006.01)
*F16L 37/04* (2006.01)
*F16L 15/00* (2006.01)

(52) U.S. Cl.
CPC ............. *F16L 37/146* (2013.01); *F16L 37/04* (2013.01); *F16L 37/142* (2013.01); *F16L 15/00* (2013.01)

(58) Field of Classification Search
CPC ......... F16L 37/146; F16L 37/04; F16L 15/00; F16L 37/142
USPC ........................................................ 285/321
See application file for complete search history.

(56) References Cited

U.S. PATENT DOCUMENTS

| | | | | |
|---|---|---|---|---|
| 3,521,911 A * | 7/1970 | Hanes | ................... | E21B 17/085 285/27 |
| 3,913,954 A * | 10/1975 | Klimpl | ................. | F16L 37/144 285/305 |
| 4,685,708 A * | 8/1987 | Conner | ............... | F16L 37/0927 285/374 |
| 4,854,764 A * | 8/1989 | Faber | ..................... | F16B 21/18 403/13 |
| 7,597,362 B2 * | 10/2009 | Hartmann | .......... | F16L 37/0885 285/321 |
| 7,976,072 B2 * | 7/2011 | Parrish | ............... | H01R 13/6275 285/312 |
| 8,267,435 B2 * | 9/2012 | Hellfeier | ................. | F16L 37/06 285/321 |

FOREIGN PATENT DOCUMENTS

WO WO-2018194404 A1 * 10/2018 .......... F16L 25/0072

* cited by examiner

*Primary Examiner* — James M Hewitt, II
(74) *Attorney, Agent, or Firm* — Alan D. Kamrath; Karin L. Williams; Mayer & Williams PC (57) ABSTRACT

A pipe connecting seat has a sleeve and two positioning members. The positioning members are disposed on the sleeve at a spaced interval. Each one of the two positioning members has a positioning arm and a positioning pin. The positioning arm is openably, positionably, and pivotally disposed on the sleeve, and has at least one reinforcing protrusion for increasing strength of the positioning arm. The positioning pin is disposed on the positioning arm and is located out of the positioning arm for positioning the positioning arm and limiting a pivoting opening range of the positioning arm. When the pipe connecting seat is connected to two pipes, the two positioning members are always located on the sleeve and are not prone to loss. The operating convenience of the pipe connecting seat is increased.

20 Claims, 14 Drawing Sheets

PIPE CONNECTING SEAT

BACKGROUND OF THE INVENTION

1. Field of the Invention

The present invention relates to a pipe connecting seat, and more particularly to a pipe connecting seat whose components are not prone to loss.

2. Description of Related Art

Figure 16:
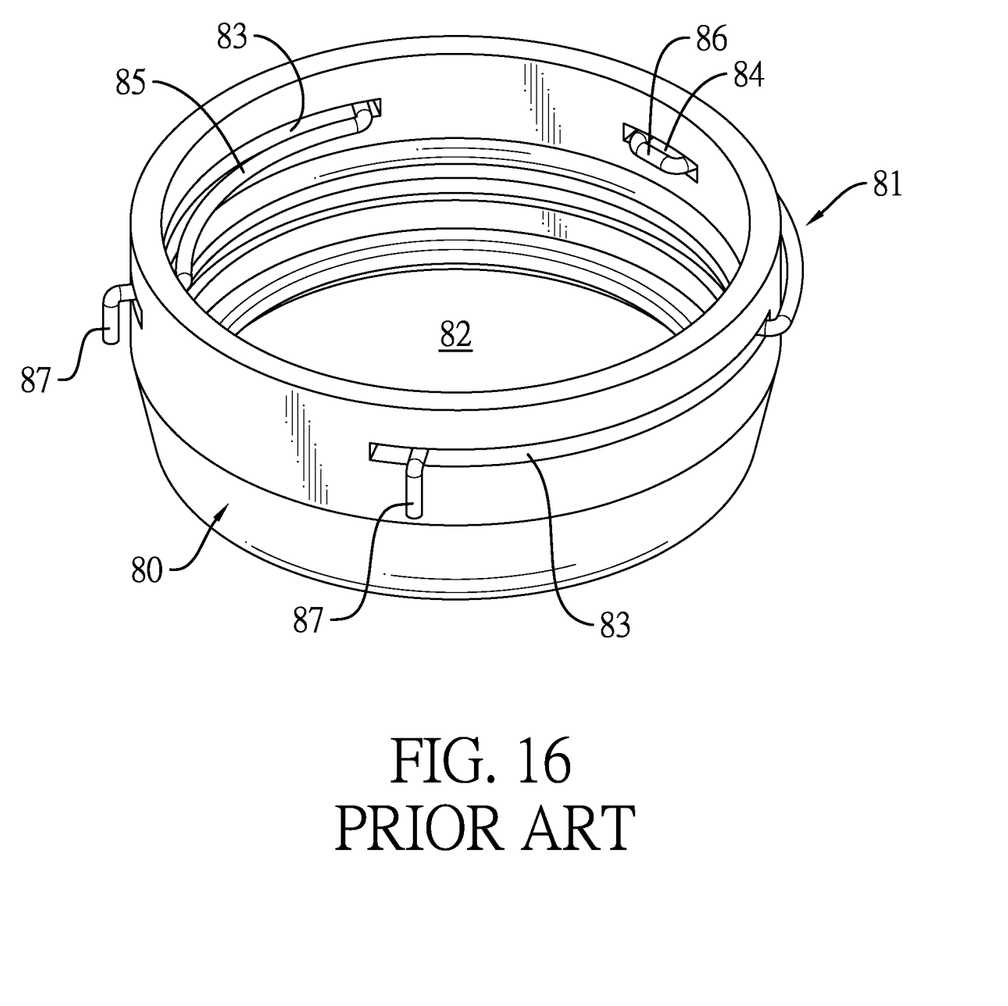
FIG. 16 is a perspective view of a conventional pipe connecting seat in accordance with the prior art.
Figure 17:
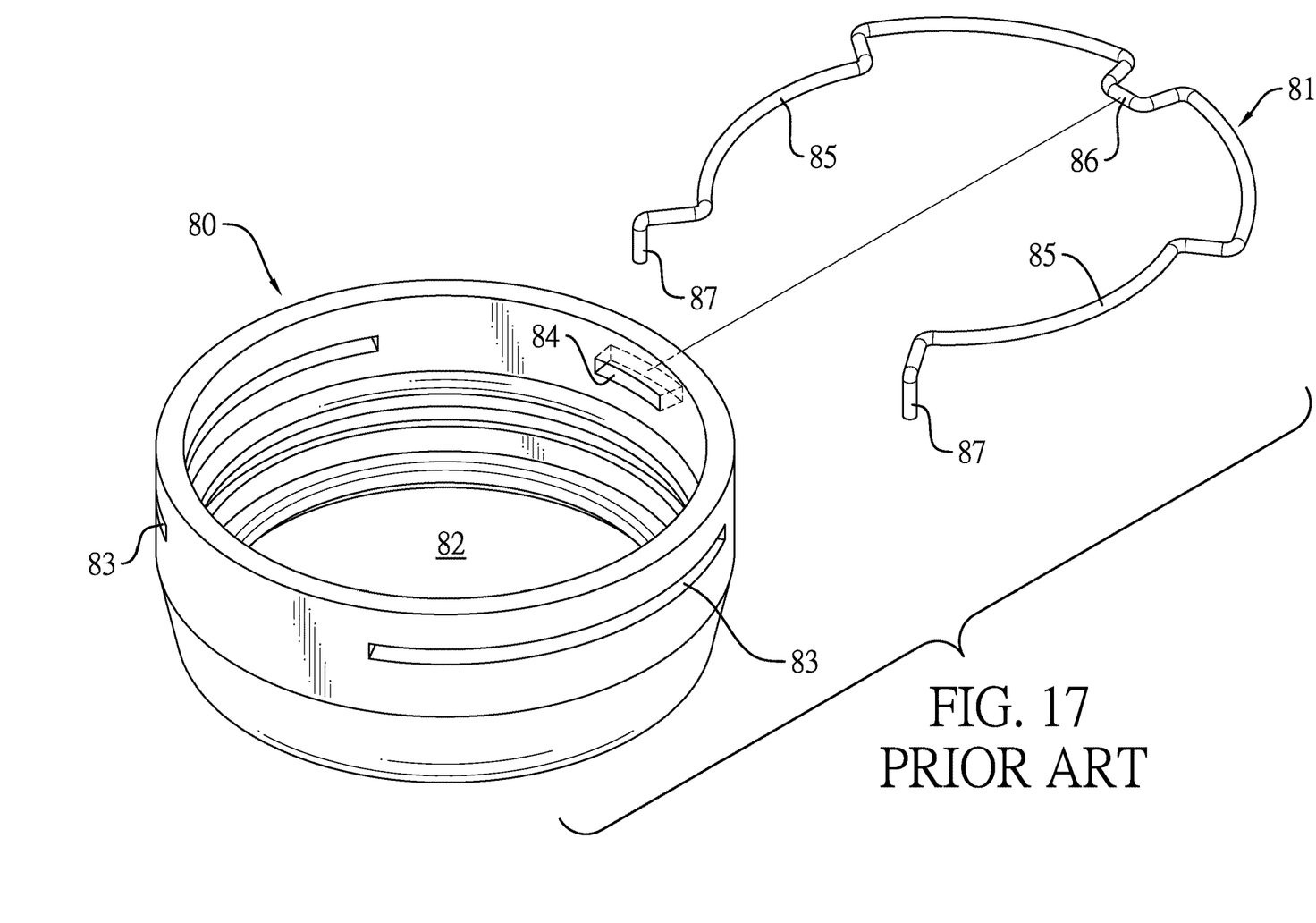
FIG. 17 is an exploded perspective view of the conventional pipe connecting seat in FIG. 16.
Figure 18:
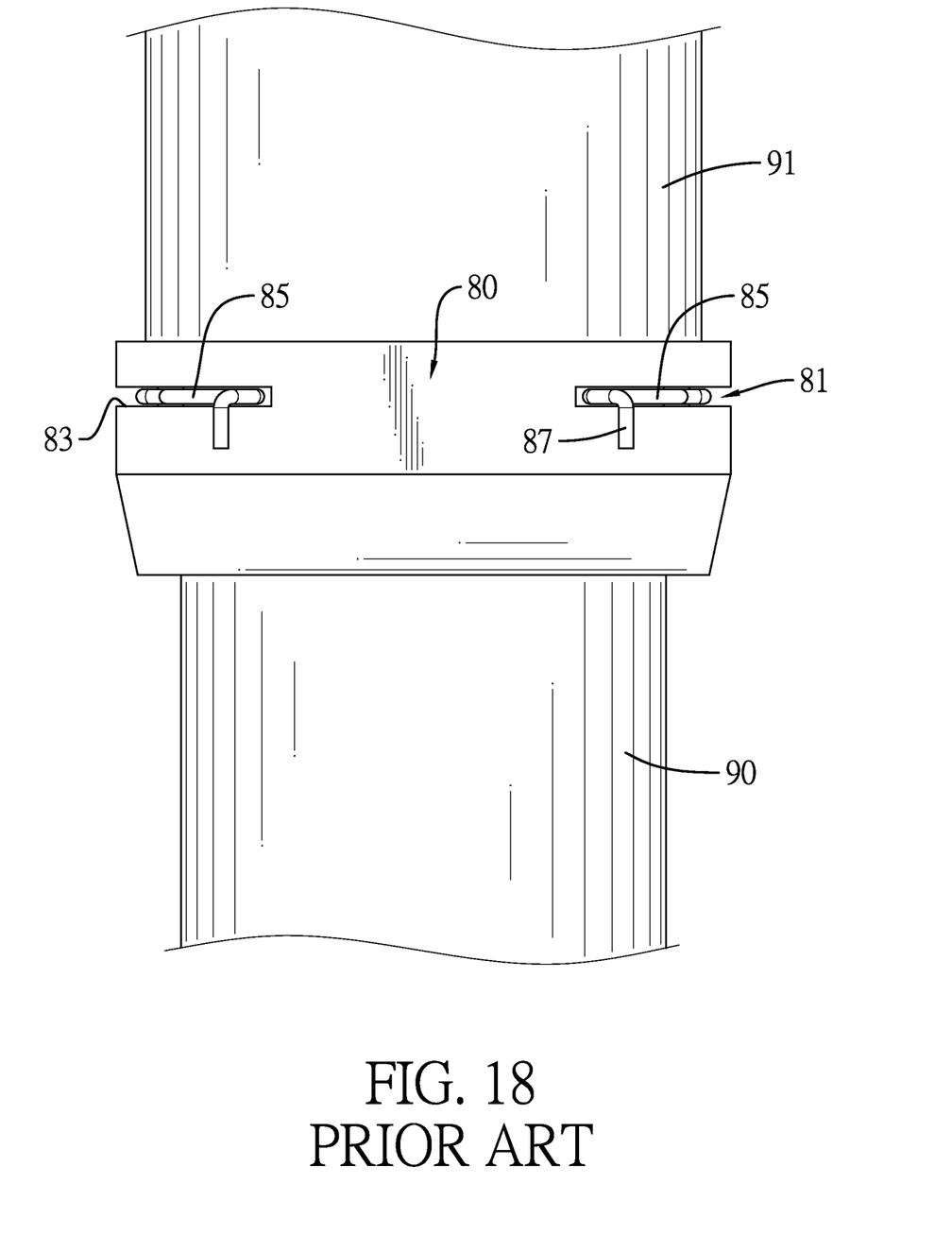
FIG. 18 is an operational rear view of the conventional pipe connecting seat in FIG. 15.

With reference to FIGS. 16 to 18, a conventional pipe connecting seat is applied to connect a first pipe 90 and a second pipe 91. The conventional pipe connecting seat has a sleeve 80 and a clamping member 81.

The sleeve 80 has a chamber 82, two first grooves 83, and a second groove 84. The chamber 82 is formed through the sleeve 80. The two first grooves 83 and the second groove 84 are formed in an outer surface of the sleeve 80 and all communicate with the chamber 82. The two first grooves 83 are diametrically opposite each other. The second groove 84 is located between the two first grooves 83.

The clamping member 81 is detachably disposed on the sleeve 80. The clamping member 81 is elastic, expandable, and contractible. The clamping member 81 has two first positioning protrusions 85, a second positioning protrusion 86, and two stopping portions 87. The two first positioning protrusions 85 are formed on the clamping member 81, are respectively inserted into the two first grooves 83, and extend out of an inner surface of the sleeve 80. The second positioning protrusion 86 is formed on the clamping member 81, is located between the two first positioning protrusions 85, is inserted into the second groove 84, and extends out of the inner surface of the sleeve 80. The two stopping portions 87 are respectively formed on two ends of the clamping member 81, are respectively connected to the two first positioning protrusions 85, and are located outside the sleeve 80.

In use, the sleeve 80 is fixedly disposed around the first pipe 90, and then the second pipe 91 is inserted into the chamber 82 of the sleeve 80. The clamping member 81 is disposed on the sleeve 80. The two positioning protrusions 85 and the second positioning protrusion 86 of the clamping member 81 are all inserted into an engaging groove of the second pipe 91 for fixing the second pipe 91 on the sleeve 80.

However, the sleeve 80 and the clamping member 81 are separate components. When the sleeve 80 is disposed around the first pipe 90 and the second pipe 91 is inserted into the sleeve 80, the clamping member 81 is not disposed on the sleeve 80 yet. Thus, the clamping member 81 is prone to loss, but the sleeve 80 cannot fix the second pipe 91 without the clamping member 81. A connecting relationship between the sleeve 80 and the clamping member 81 is not established until the clamping member 81 engages with the second pipe 91 inserted into the sleeve 80. The clamping member 81 is thus prone to loss, depriving the conventional pipe connecting seat of the connecting pipe function.

To overcome the shortcomings, the present invention provides a pipe connecting seat to mitigate or obviate the aforementioned problems.

SUMMARY OF THE INVENTION

The objective of the invention is to provide a pipe connecting seat that can solve the shortcoming that the clamping member of the conventional pipe connecting seat is prone to loss.

The pipe connecting seat has a sleeve and two positioning members. The sleeve has a chamber formed through the sleeve, an outer surface, an inner surface, and two disposing members. The disposing members are disposed on the outer surface of the sleeve at a spaced interval. Each one of the two disposing members has an insertion groove formed on the outer surface of the sleeve and communicating with the chamber of the sleeve.

The positioning members are respectively disposed on the two disposing members of the sleeve. Each one of the two positioning members has a positioning arm and a positioning pin. The positioning arm is openably, positionably, and pivotally disposed on a corresponding one of the two disposing members, and has at least one reinforcing protrusion and multiple elastic positioning protrusions. The at least one reinforcing protrusion is formed on the positioning arm and protrudes outwardly. The elastic positioning protrusions are formed on the positioning arm beside the at least one reinforcing protrusion, protrude inwardly, and extend out of the inner surface of the sleeve. The positioning pin is disposed on the positioning arm and is located out of the positioning arm for positioning the positioning arm and limiting a pivoting opening range of the positioning arm.

When the positioning arm of each one of the two positioning members is closed, the positioning arm of each one of the two positioning members is inserted into the insertion groove of a corresponding one of the two disposing members and extends out of the inner surface of the sleeve.

The two positioning members are disposed on the sleeve. When the pipe connecting seat is not connected to two pipes yet, the two positioning members are always connected to the sleeve and are not separated from the sleeve. The two positioning members are not prone to loss. When the pipe connecting seat is connected to the two pipes, the two positioning members are always connected to and move with the sleeve. A user controls the positioning arms to close for positioning the pipes. The operating convenience of the pipe connecting seat is increased.

Furthermore, the disposition of the at least one reinforcing protrusion can improve the strengths of the elastic positioning protrusions, and thereby the engaging strengths of the two positioning arms are enhanced for increasing the pipe positioning stability of the pipe connecting seat.

In addition, in each one of the two positioning members, the positioning pin is located out of the positioning arm for preventing the positioning arm from escaping the insertion groove, and for adjusting the pivoting opening range and flexibility of the positioning arm. When the pipes are inserted into the sleeve, the positioning arms of the two positioning members are opened without interfering with the pipes. When the positioning arms of the two positioning members are closed, the elastic positioning protrusions can be inserted into the corresponding one of the two pipes for positioning the corresponding one of the two pipes.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
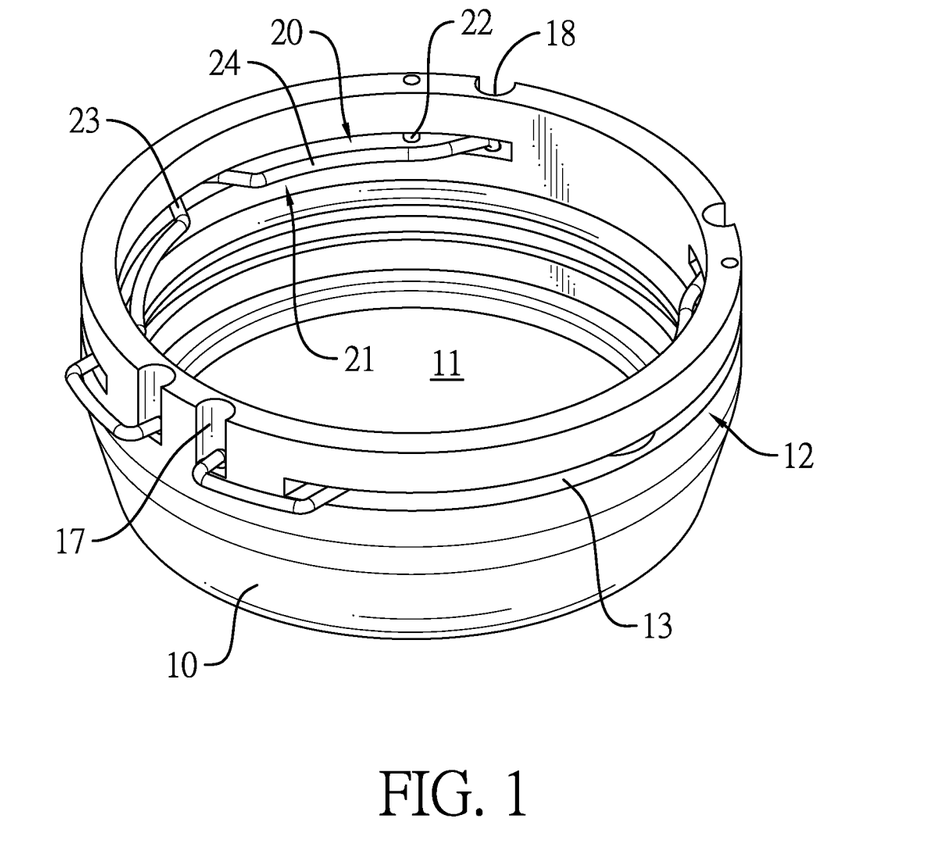
FIG. 1 is a perspective view of a first embodiment of a pipe connecting seat in accordance with the present invention.
Figure 2:
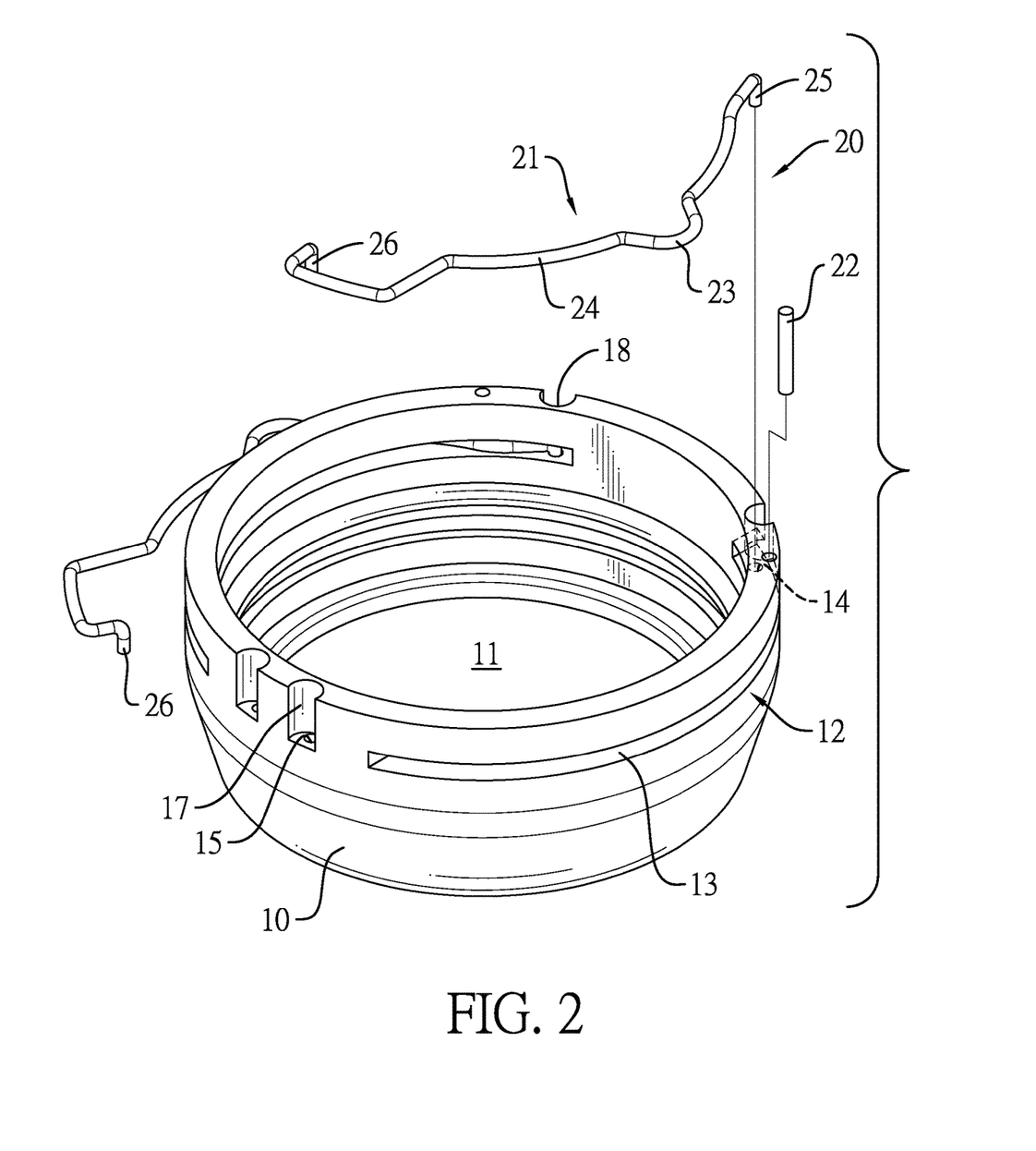
FIG. 2 is an exploded perspective view of the pipe connecting seat in FIG. 1.
Figure 3:
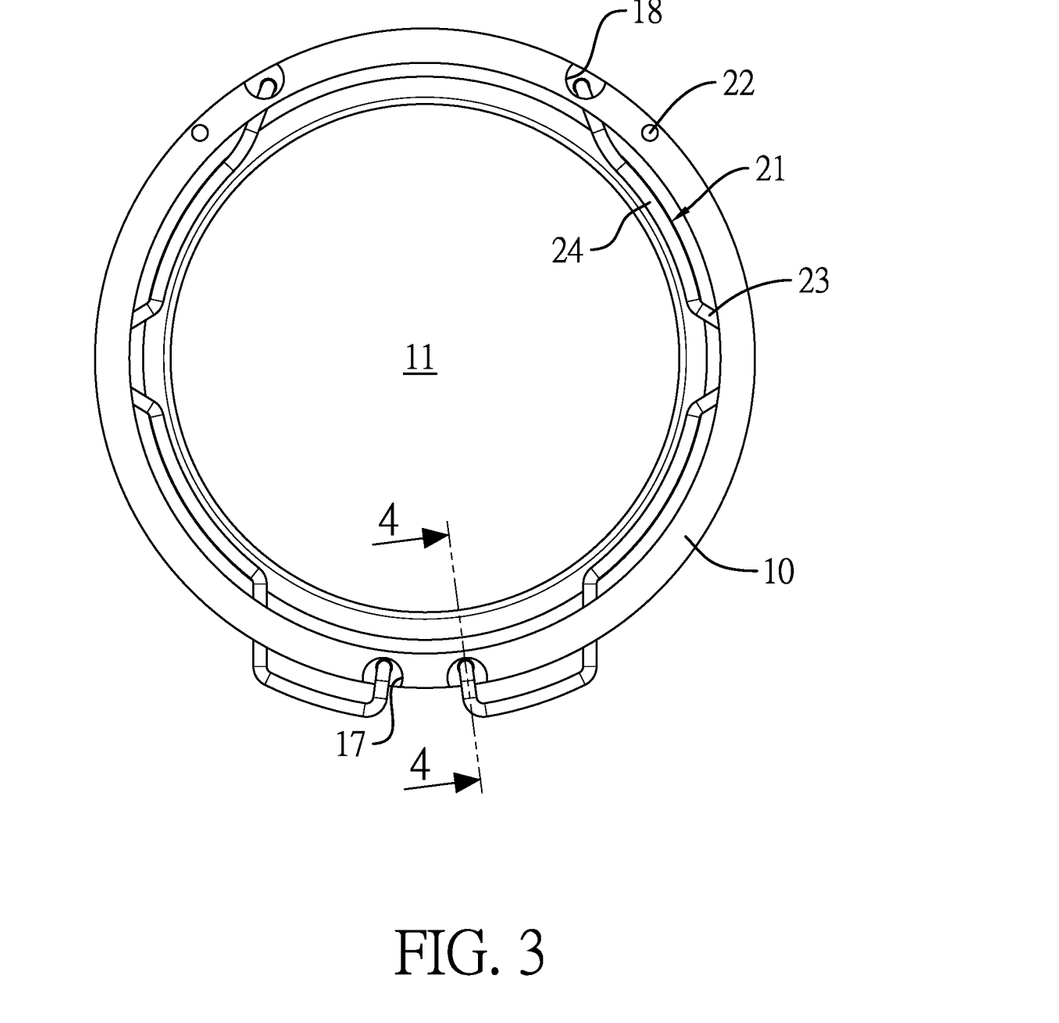
FIG. 3 is a top view of the pipe connecting seat in FIG. 1.

With reference to FIGS. 1 to 3, a pipe connecting seat in accordance with the present invention has a sleeve 10 and two positioning members 20.

Figure 4:
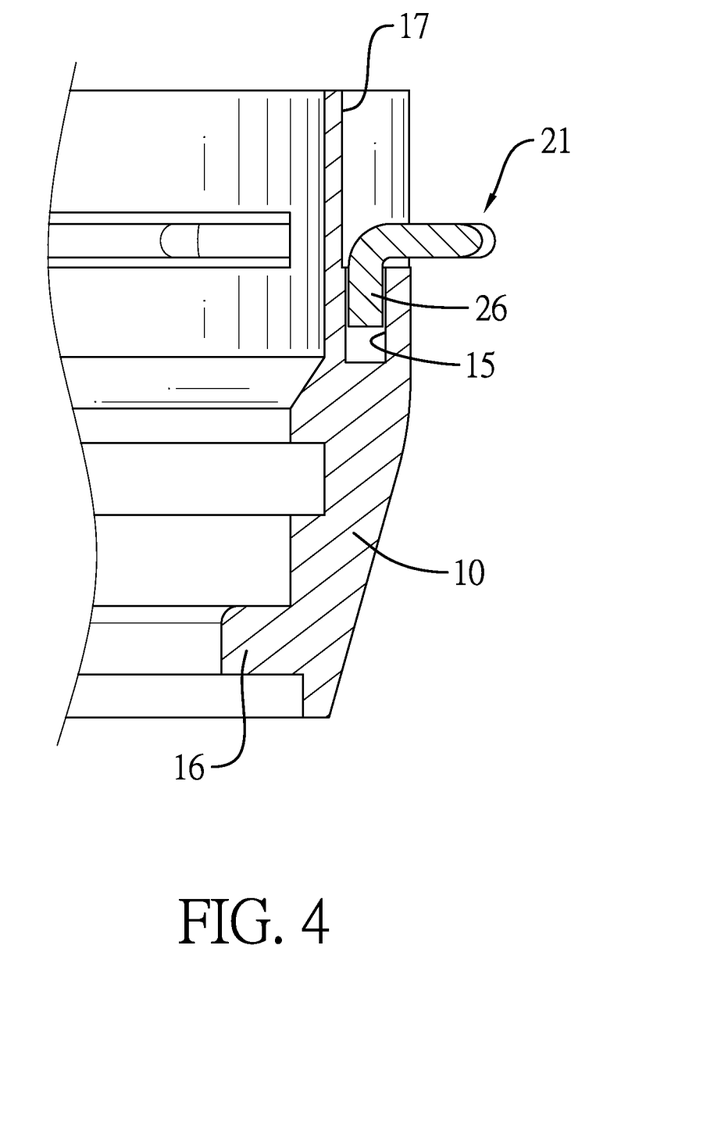
FIG. 4 is an enlarged cross sectional side view of the pipe connecting seat along line 4-4 in FIG. 3.

The sleeve 10 has a chamber 11, an outer surface, an inner surface, and two disposing members 12. The chamber 11 is formed through the sleeve 10. The two disposing members 12 are respectively disposed on the outer surface of the sleeve 10 at a spaced interval. Each one of the two disposing members has an insertion groove 13. The insertion groove 13 is formed in the outer surface of the sleeve 10 and communicates with the chamber 11 of the sleeve 10. With reference to FIG. 4, the sleeve 10 has at least one flange 16 formed on the inner surface of the sleeve 10.

Figure 5:
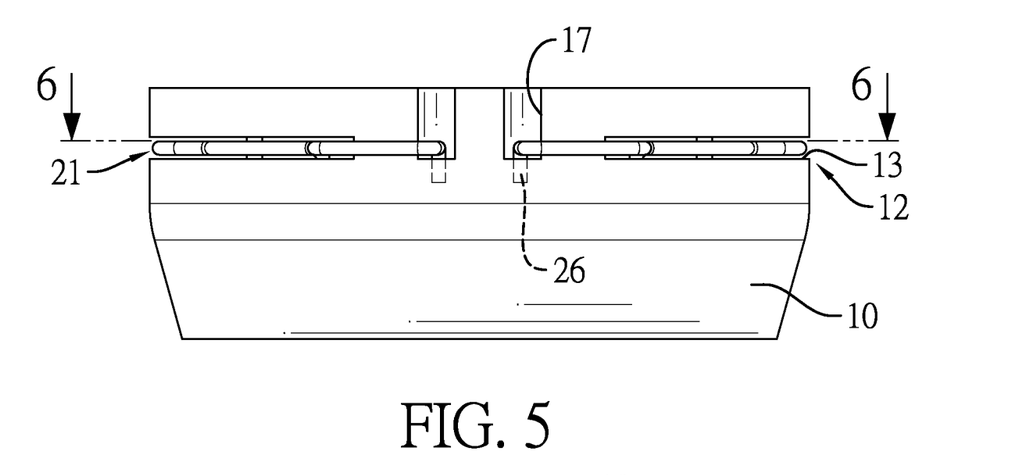
FIG. 5 is a rear view of the pipe connecting seat in FIG. 1.
Figures 7, 8:
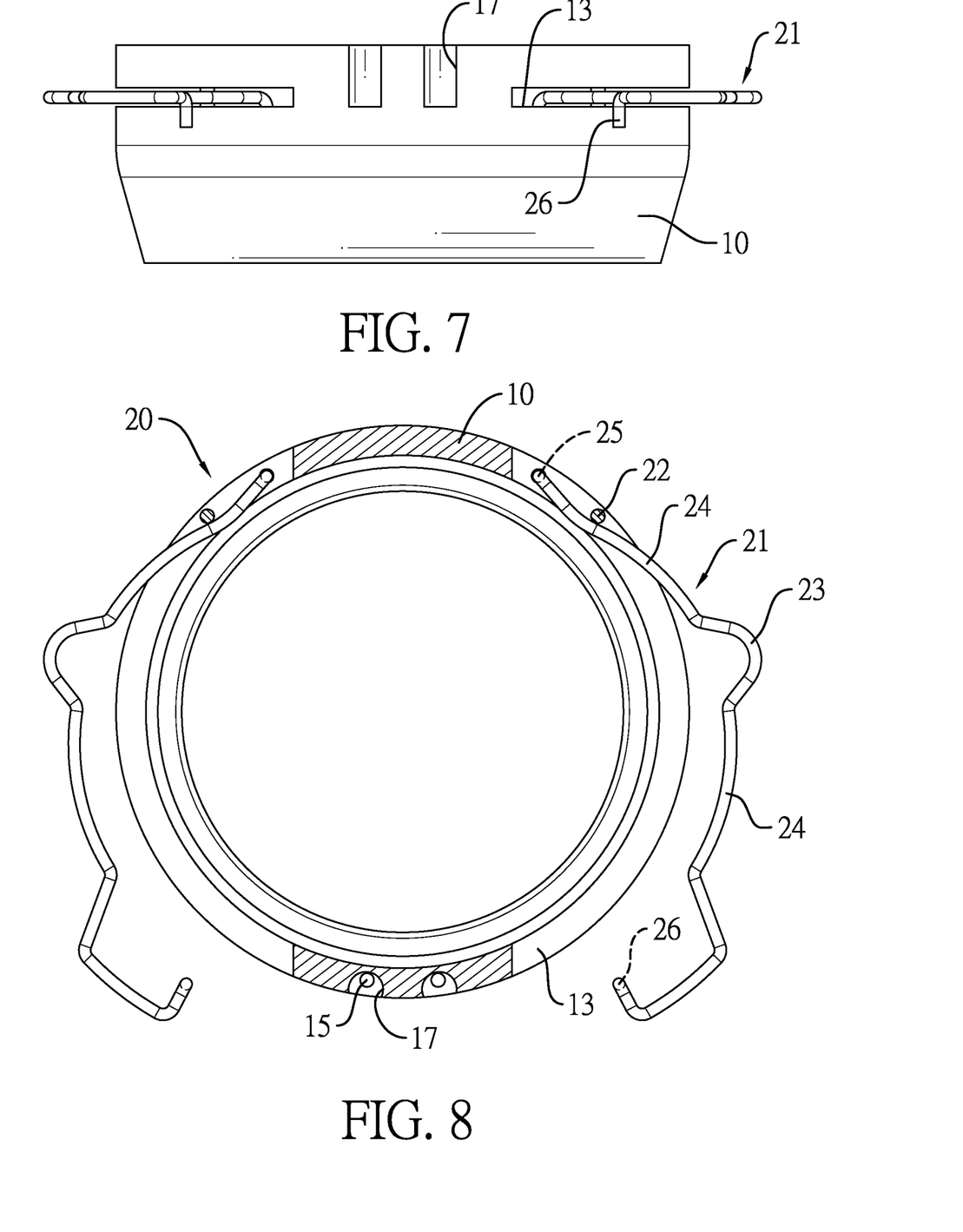
FIG. 7 is another rear view of the pipe connecting seat in FIG. 1, showing that two positioning arms are opened.
FIG. 8 is a cross sectional top view of the pipe connecting seat in FIG. 7.

With reference to FIGS. 2, 5, and 8, the two positioning members 20 are respectively disposed on the two disposing members 12 of the sleeve 10. Each one of the two positioning members 20 has a positioning arm 21 and a positioning pin 22. The positioning arm 21 is openably, positionably, and pivotally disposed on a corresponding one of the two disposing members 12. The positioning arm 21 has at least one reinforcing protrusion 23 and multiple elastic positioning protrusions 24. The at least one reinforcing protrusion 23 is formed on the positioning arm 21 and protrudes outwardly. The elastic positioning protrusions 24 are formed on the positioning arm 21 beside the at least one reinforcing protrusion 23, protrude inwardly, and extend out of the inner surface of the sleeve 10. The positioning pin 22 is disposed on the positioning arm 21 and is located out of the positioning arm 21 for positioning the positioning arm 21 and limiting a pivoting opening range of the positioning arm 21.

When the positioning arm 21 of each one of the two positioning members 20 is closed, the positioning arm 21 of each one of the two positioning members 20 is inserted into the insertion groove 13 of a corresponding one of the two disposing members 12 and extends out of the inner surface of the sleeve 10.

Figure 15:
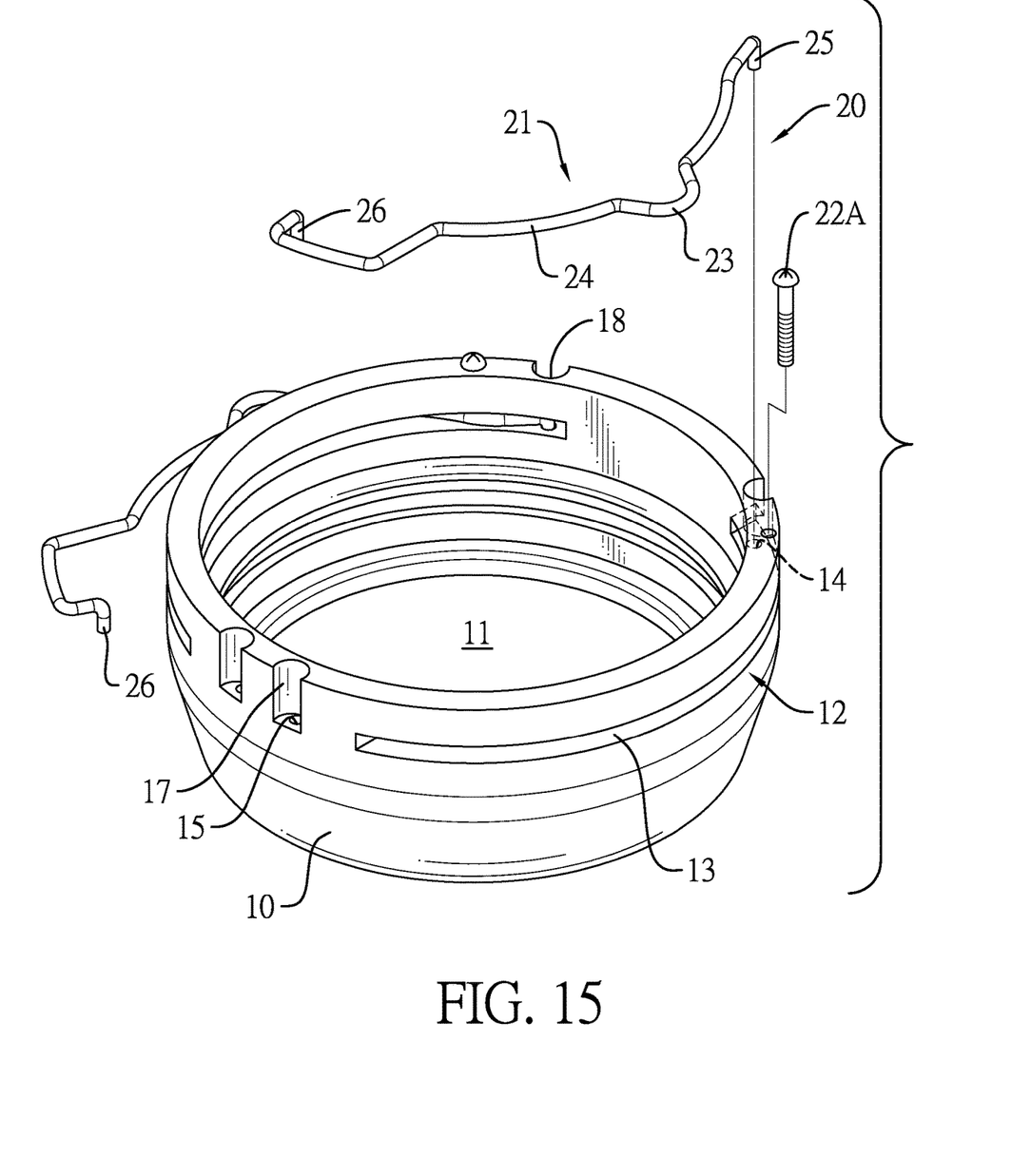
FIG. 15 is an exploded perspective view of a fourth embodiment of a pipe connecting seat in accordance with the present invention.

Furthermore, the positioning pin 22 of each one of the two positioning members 20 is a rivet and is riveted into the sleeve 10. Alternatively, with reference to FIG. 15, the positioning pin 22A of each one of the two positioning members 20 is a screw and is screwed into the sleeve 10. Alternatively, the positioning pin 22 of each one of the two positioning members 20 is a rod and is adhered to the sleeve 10.

Each one of the two disposing members 12 has an insertion hole 14 and a positioning hole 15. The insertion hole 14 is longitudinally formed in the sleeve 10 and communicates with the insertion groove 13. The positioning hole 15 is formed in the sleeve 10 and is located adjacent to an end of the insertion groove 13 away from the insertion hole 14. In each one of the two positioning members 20, the positioning arm 21 has an insertion portion 25 and a positioning portion 26. The insertion portion 25 is formed on an end of the positioning arm 21 and is inserted into the insertion hole 14. The positioning portion 26 is formed on the other end of the positioning arm 21 and is detachably inserted into the positioning hole 15. The at least one reinforcing protrusion 23 is located between the insertion portion 25 and the positioning portion 26. The positioning pin 22 is inserted into the insertion groove 13 adjacent to the insertion portion 25.

Figure 12:
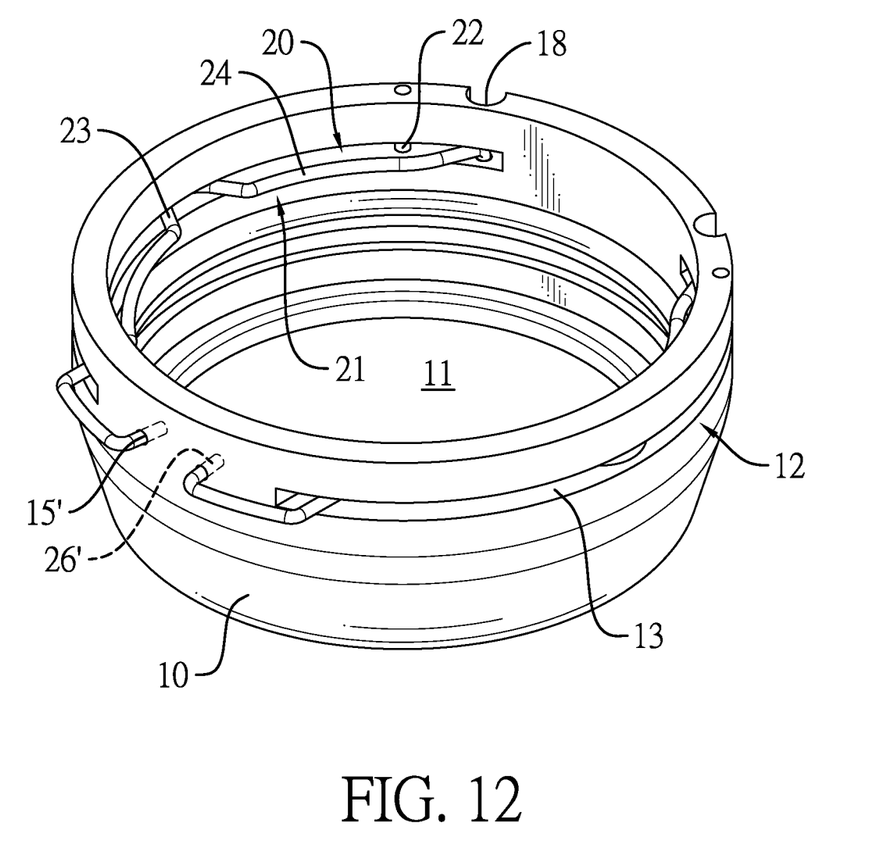
FIG. 12 is a perspective view of a second embodiment of a pipe connecting seat in accordance with the present invention.

With reference to FIGS. 2 to 4, in the two disposing members 12, the two positioning holes 15 are longitudinally formed in the sleeve 10. The sleeve 10 has a top surface and two notches 17. The two notches 17 are formed in the top surface of the sleeve 10, extend downwardly, and respectively communicate with the two positioning holes 15 of the two disposing members 12. With reference to FIG. 12, in the second embodiment, the two positioning holes 15' are radially formed in the sleeve 10. The two positioning portions 26' are inserted into the two positioning holes 15', respectively.

The sleeve 10 has two guiding grooves 18. The two guiding grooves 18 are formed in the top surface of the sleeve 10, extend downwardly, respectively communicate with the insertion grooves 13 of the two disposing members 12, and are respectively located above the insertion holes 14 of the two disposing members 12.

Figure 6:
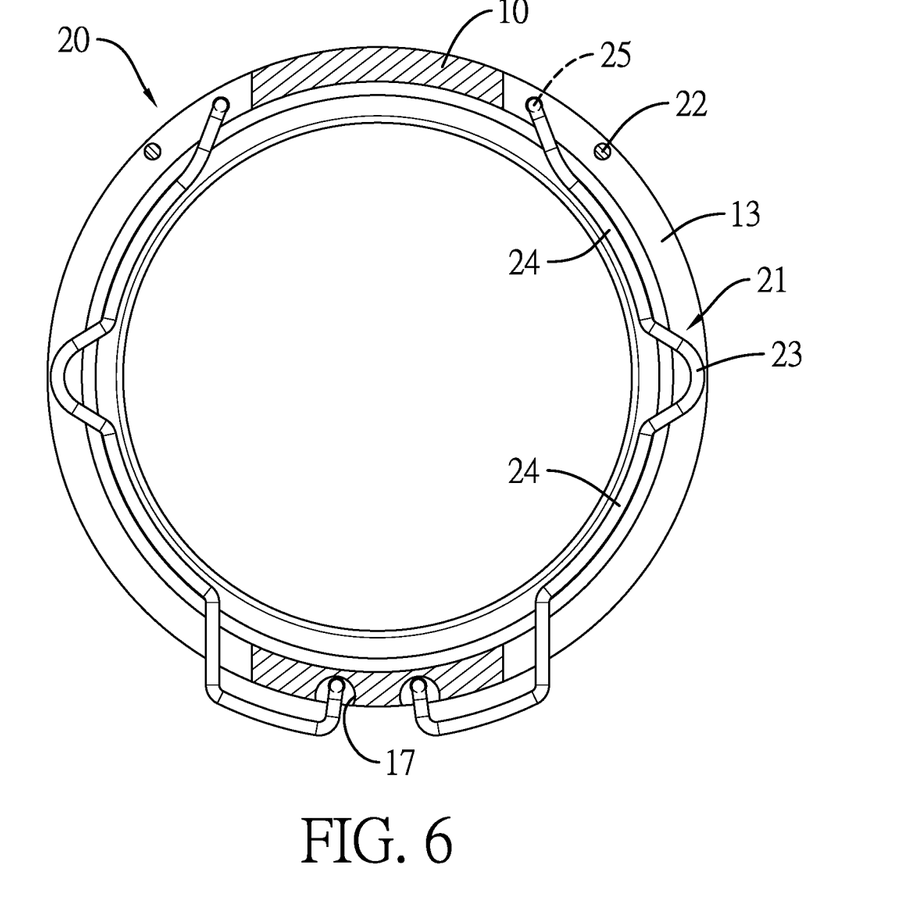
FIG. 6 is a cross sectional top view of the pipe connecting seat along line 6-6 in FIG. 4.
Figure 13:
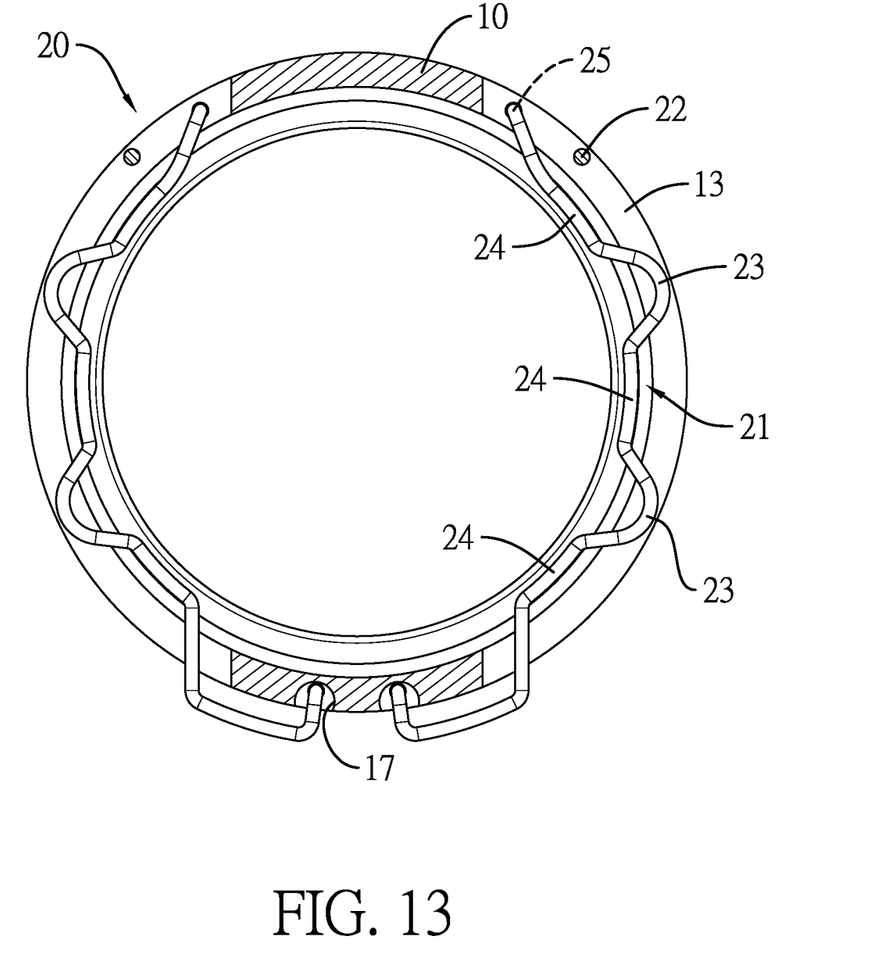
FIG. 13 is a cross sectional top view of a third embodiment of a pipe connecting seat in accordance with the present invention.

With reference to FIGS. 6 and 13, in each one of the two positioning arms 21, the amount of the at least one reinforcing protrusion 23 may be one or two, and may be increased according to need. As the amount of the at least one reinforcing protrusion 23 is increased, the overall length of each one of the elastic positioning protrusions 24 is decreased, and each one of the elastic positioning protrusions 24 is not prone to deformation, thereby enhancing the structural strength of the positioning arm 21.

Figure 14:
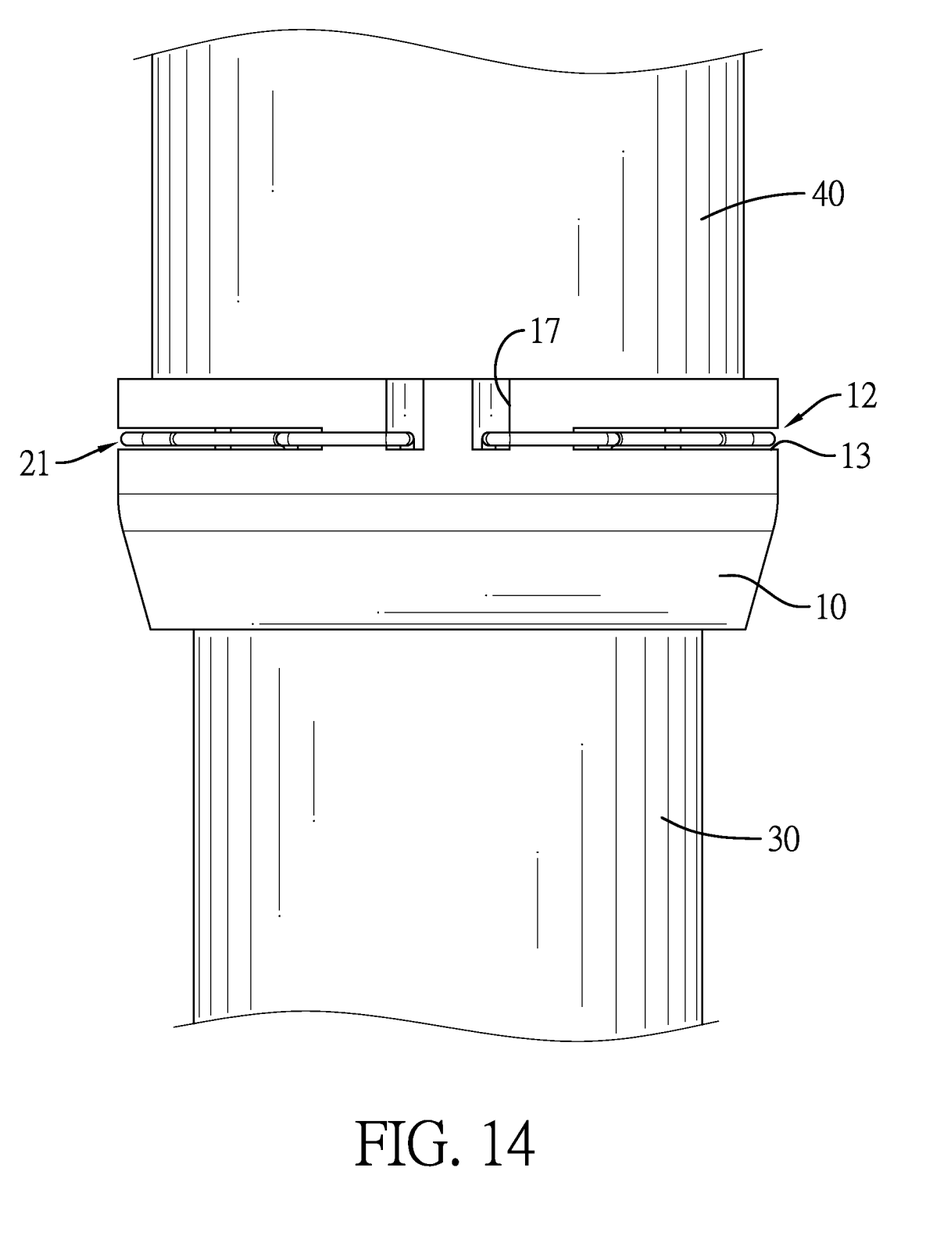
FIG. 14 is an operational rear view of the pipe connecting seat in FIG. 1.

With reference to FIG. 14, the pipe connecting seat is applied to connect a first pipe 30 and a second pipe 40. Firstly, the sleeve 10 is disposed around the first pipe 30, and the two positioning arms 21 are opened. Then, the second pipe 40 is inserted into the chamber 11 of the sleeve 10, the two positioning arms 21 forced by a user are pivoted to close, and the elastic positioning protrusions 24 of the two positioning arms 21 are inserted into an engaging groove of the second pipe 40 for fixing the second pipe 40 on the pipe connecting seat.

With reference to FIGS. 7, 8, and 14, when the two positioning arms 21 are opened, the two positioning arms 21 respectively abut against the two positioning pins 22. The two positioning arms 21 use the two positioning pins 22 as fulcrums to limit the pivoting opening range of the two positioning arms 21. The elastic positioning protrusions 24 of the two positioning arms 21 move outwardly and are kept from protruding out of the inner surface of the sleeve 10. The second pipe 40 can be inserted into the chamber 11 of the sleeve 10 without being interfered by the elastic positioning protrusions 24.

Figure 9:
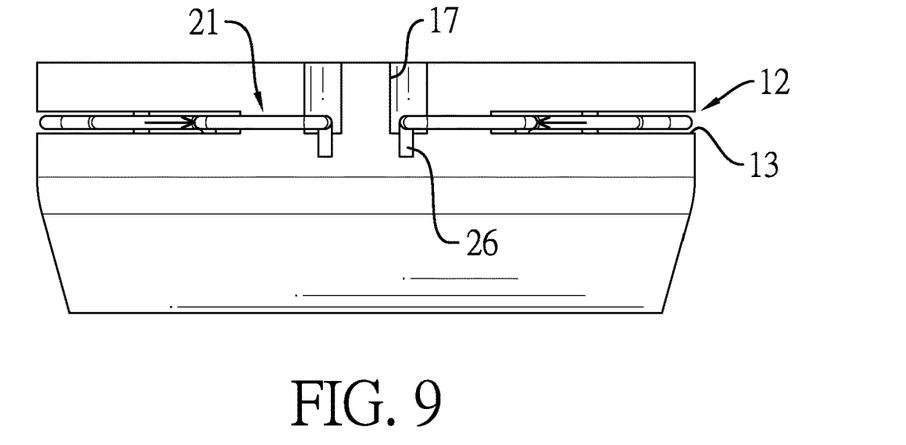
FIG. 9 is an operational rear view of the pipe connecting seat in FIG. 7, showing that the two positioning arms are moved toward each other.
Figure 10:
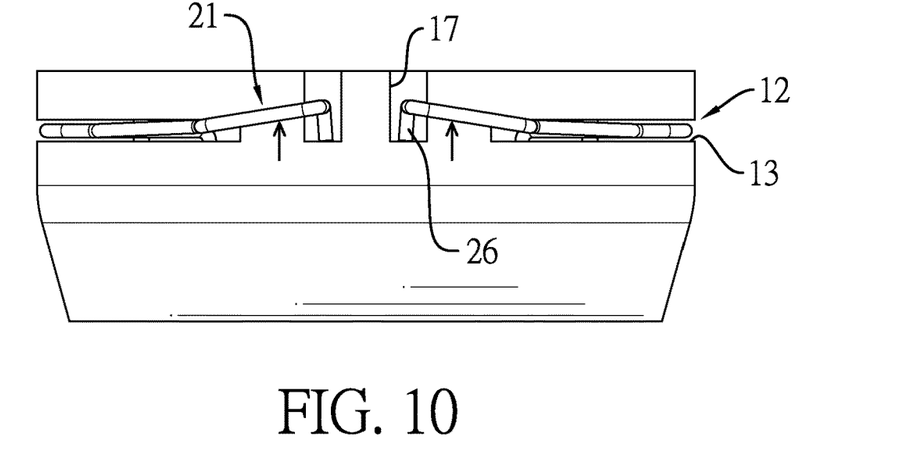
FIG. 10 is an operational rear view of the pipe connecting seat in FIG. 9, showing that the two positioning arms are moved into two notches.
Figure 11:
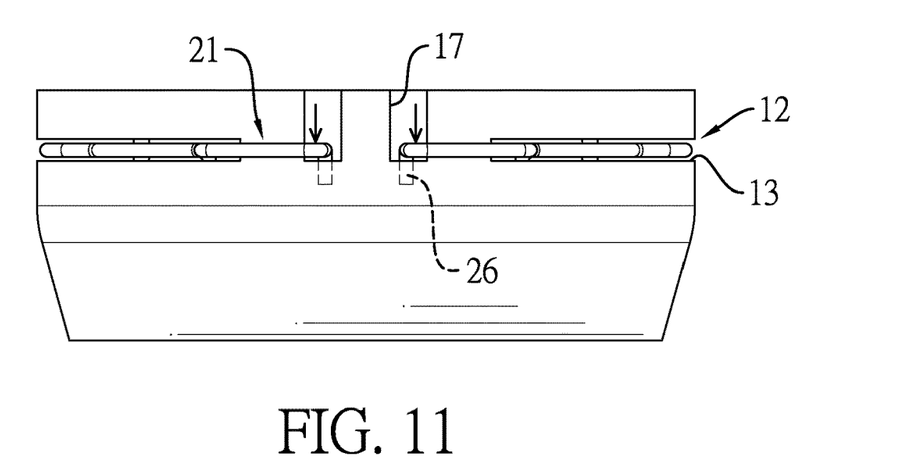
FIG. 11 is an operational rear view of the pipe connecting seat in FIG. 10, showing that the two positioning arms are moved into two positioning holes.

With reference to FIGS. 9 to 11, when the two positioning arms 21 are closed, the two positioning arms 21 are forced by the user and are pivoted toward each other. The two positioning portions 26 of the two positioning arms 21 are moved to align respectively with the two notches 17 of the sleeve 10. The two positioning portions 26 forced by user are moved upwardly and into the two notches 17. The two positioning portions 26 are respectively inserted into the two positioning holes 15 for closing and positioning the two positioning arms 21.

Accordingly, the two positioning arms 21 are always connected to the sleeve 10 no matter whether the two positioning arms 21 are opened or closed, and are not separated from the sleeve 10. When the pipe connecting seat is not connected to the first pipe 30 yet, when the pipe connecting seat is connected to the first pipe 30 and not connected to the second pipe 40 yet, or when the pipe connecting seat is connected to the first pipe 30 and the second pipe 40, the two positioning arms 21 are always located on the sleeve 10 without being lost.

The two positioning arms 21 are always located on the sleeve 10. When the pipe connecting seat is connected to the second pipe 40, the user can control the two positioning arms 21 of the two positioning members 20 to close for positioning the second pipe 40. Therefore, the two positioning arms 21 are convenient to operate.

Furthermore, in each one of the two positioning arms 21, the overall length and flexibility of each one of the elastic positioning protrusions 24 are adjusted by the at least one reinforcing protrusion 23. Strength of each one of the elastic positioning protrusions 24 is increased. The engaging strength between the positioning arm 21 and the second pipe 40 is increased for increasing the pipe positioning stability of the pipe connecting seat.

In addition, in each one of the two positioning members 20, the positioning pin 22 is located out of the positioning arm 21 for preventing the positioning arm 21 from escaping the insertion groove 13 and adjusting the pivoting opening range and flexibility of the positioning arm 21.

What is claimed is:

1. A pipe connecting seat comprising:
   a sleeve having
      a chamber formed through the sleeve;
      an outer surface;
      an inner surface; and
      two disposing members respectively disposed on the outer surface of the sleeve at a spaced interval, and each one of the two disposing members having
         an insertion groove formed in the outer surface of the sleeve and communicating with the chamber of the sleeve; and
   two positioning members respectively disposed on the two disposing members of the sleeve, and each one of the two positioning members having
      a positioning arm openably, positionably, and pivotally disposed on a corresponding one of the two disposing members, and having
         at least one reinforcing protrusion formed on the positioning arm and protruding outwardly; and
         multiple elastic positioning protrusions formed on the positioning arm beside the at least one reinforcing protrusion, protruding inwardly, and extending out of the inner surface of the sleeve; and
      a positioning pin disposed on the positioning arm and located out of the positioning arm for positioning the positioning arm and limiting a pivoting opening range of the positioning arm; and
   wherein when the positioning arm of each one of the two positioning members is closed, the positioning arm of each one of the two positioning members is inserted into the insertion groove of a corresponding one of the two disposing members and extends out of the inner surface of the sleeve.

2. The pipe connecting seat as claimed in claim 1, wherein the positioning pin of each one of the two positioning members is a rivet.

3. The pipe connecting seat as claimed in claim 1, wherein the positioning pin of each one of the two positioning members is a screw.

4. The pipe connecting seat as claimed in claim 1, wherein the positioning pin of each one of the two positioning members is a rod and is adhered to the sleeve.

5. The pipe connecting seat as claimed in claim 1, wherein each one of the two disposing members has
   an insertion hole longitudinally formed in the sleeve and communicating with the insertion groove; and
   a positioning hole formed in the sleeve and located adjacent to an end of the insertion groove away from the insertion hole; and
each one of the two positioning members has
   the positioning arm having
      two ends;
      an insertion portion formed on one of the two ends of the positioning arm and inserted into the insertion hole;
      a positioning portion formed on the other one of the two ends of the positioning arm and detachably inserted into the positioning hole;
      the at least one reinforcing protrusion located between the insertion portion and the positioning portion; and
   the positioning pin inserted into the insertion groove adjacent to the insertion portion.

6. The pipe connecting seat as claimed in claim 2, wherein each one of the two disposing members has
   an insertion hole longitudinally formed in the sleeve and communicating with the insertion groove; and
   a positioning hole formed on the sleeve and located adjacent to an end of the insertion groove away from the insertion hole; and
each one of the two positioning members has
   the positioning arm having
      two ends;
      an insertion portion formed on one of the two ends of the positioning arm and inserted into the insertion hole;

a positioning portion formed on the other one of the two ends of the positioning arm and detachably inserted into the positioning hole;

the at least one reinforcing protrusion located between the insertion portion and the positioning portion; and the positioning pin inserted into the insertion groove adjacent to the insertion portion.

7. The pipe connecting seat as claimed in claim 3, wherein each one of the two disposing members has an insertion hole longitudinally formed in the sleeve and communicating with the insertion groove; and a positioning hole formed on the sleeve and located adjacent to an end of the insertion groove away from the insertion hole; and each one of the two positioning members has the positioning arm having two ends;

an insertion portion formed on one of the two ends of the positioning arm and inserted into the insertion hole;

a positioning portion formed on the other one of the two ends of the positioning arm and detachably inserted into the positioning hole;

the at least one reinforcing protrusion located between the insertion portion and the positioning portion; and the positioning pin inserted into the insertion groove adjacent to the insertion portion.

8. The pipe connecting seat as claimed in claim 4, wherein each one of the two disposing members has an insertion hole longitudinally formed in the sleeve and communicating with the insertion groove; and a positioning hole formed on the sleeve and located adjacent to an end of the insertion groove away from the insertion hole; and each one of the two positioning members has the positioning arm having two ends;

an insertion portion formed on one of the two ends of the positioning arm and inserted into the insertion hole;

a positioning portion formed on the other one of the two ends of the positioning arm and detachably inserted into the positioning hole;

the at least one reinforcing protrusion located between the insertion portion and the positioning portion; and the positioning pin inserted into the insertion groove adjacent to the insertion portion.

9. The pipe connecting seat as claimed in claim 5, wherein the positioning hole of each disposing member is longitudinally formed in the sleeve, the sleeve has a top surface and two notches, and the two notches are formed in the top surface of the sleeve, extend downwardly, and respectively communicate with the two positioning holes of the two disposing members.

10. The pipe connecting seat as claimed in claim 6, wherein the positioning hole of each disposing member is longitudinally formed in the sleeve, the sleeve has a top surface and two notches, and the two notches are formed on the top surface of the sleeve, extend downwardly, and respectively communicate with the two positioning holes of the two disposing members.

11. The pipe connecting seat as claimed in claim 7, wherein the positioning hole of each disposing member is longitudinally formed in the sleeve, the sleeve has a top surface and two notches, and the two notches are formed on the top surface of the sleeve, extend downwardly, and respectively communicate with the two positioning holes of the two disposing members.

12. The pipe connecting seat as claimed in claim 8, wherein the positioning hole of each disposing member is longitudinally formed in the sleeve, the sleeve has a top surface and two notches, and the two notches are formed on the top surface of the sleeve, extend downwardly, and respectively communicate with the two positioning holes of the two disposing members.

13. The pipe connecting seat as claimed in claim 5, wherein the positioning hole of each disposing member is radially formed in the sleeve.

14. The pipe connecting seat as claimed in claim 6, wherein the positioning hole of each disposing member is radially formed in the sleeve.

15. The pipe connecting seat as claimed in claim 7, wherein the positioning hole of each disposing member is radially formed in the sleeve.

16. The pipe connecting seat as claimed in claim 8, wherein the positioning hole of each disposing member is radially formed in the sleeve.

17. The pipe connecting seat as claimed in claim 5, wherein the sleeve has a top surface and two guiding grooves, and the two guiding grooves are formed in the top surface of the sleeve, extend downwardly, respectively communicate with the insertion grooves of the two disposing members, and are respectively located above the insertion holes of the two disposing members.

18. The pipe connecting seat as claimed in claim 6, wherein the sleeve has a top surface and two guiding grooves, and the two guiding grooves are formed in the top surface of the sleeve, extend downwardly, respectively communicate with the insertion grooves of the two disposing members, and are respectively located above the insertion holes of the two disposing members.

19. The pipe connecting seat as claimed in claim 7, wherein the sleeve has a top surface and two guiding grooves, and the two guiding grooves are formed in the top surface of the sleeve, extend downwardly, respectively communicate with the insertion grooves of the two disposing members, and are respectively located above the insertion holes of the two disposing members.

20. The pipe connecting seat as claimed in claim 8, wherein the sleeve has a top surface and two guiding grooves, and the two guiding grooves are formed in the top surface of the sleeve, extend downwardly, respectively communicate with the insertion grooves of the two disposing members, and are respectively located above the insertion holes of the two disposing members.

* * * * *